Dec. 6, 1960  S. R. SIXBEY ET AL  2,963,672
MULTI-ELEMENT BOLOMETER CONNECTOR
Filed May 19, 1958

INVENTOR
SAMUEL R. SIXBEY
ARTHUR E. WOODWARD
BY
Mitchell T Bedert
ATTORNEYS

United States Patent Office 2,963,672
Patented Dec. 6, 1960

2,963,672

MULTI-ELEMENT BOLOMETER CONNECTOR

Samuel R. Sixbey, Amityville, and Arthur E. Woodward, Farmingdale, N.Y., assignors to Servo Corporation of America, New Hyde Park, N.Y., a corporation of New York Filed May 19, 1958, Ser. No. 736,259

20 Claims. (Cl. 338—17)

This invention relates to multiple-element bolometers and more particularly to such bolometers having arrays of thermistor bolometer elements.

In scanning infrared-detection systems, as for example, of the character disclosed in copending Blackstone et al. application Serial No. 320,272, filed November 13, 1952, the speed of field coverage and scanning effectiveness are enhanced by employing multiple-element arrays of bolometer elements. Most of these systems use mirrors as the scanning optical elements and, therefore, the bolometers must be located between the field and the collecting mirror. This imposes severe limitations on overall permissible elements in an array, for any given optical system.

It is, accordingly, a general object of the invention to provide an improved multiple-element bolometer particularly adapted to a scanning infrared-detection system.

It is another object of the invention to provide a multiple-element bolometer with a linear array of thermistor elements whose circuit wiring is simple, well ordered, and imposes no limitations on the number of elements in the array.

It is also an object to provide an improved multiple-element bolometer construction which inherently provides minimum masking of incoming or collected radiation, and which therefore provides a greater array-element capacity for any given optical collecting system.

It is a further object of the invention to provide a multiple-element bolometer having linear arrays of thermistor elements wherein the thermistor elements are highly accessible and easily replaceable.

It is another general object of the invention to provide a multiple-element bolometer containing thermistor elements, which, while accomplishing the above objects, is compact, rugged, and highly reliable.

Other objects and various features of novelty and invention will be pointed out or will occur to those skilled in the art from a reading of the following specification in conjunction with the accompanying drawings. In said drawings, which show, for illustrative purposes only, preferred form of the invention:

Generally, the invention contemplates a multiple-element bolometer comprising a plurality of thermistors disposed along one face of a supporting block or heat sink. Each of the thermistors has a pair of signal leads for coupling to an electrical circuit. A common electrical conductor disposed along one side of the block is connected to one signal lead of each of the thermistors. Each of the other signal leads of the thermistors is respectively connected to one of a plurality of electrical conductors printed on a junction strip disposed on another side of the block.

In another aspect of the invention, first and second pluralities of thermistors are disposed on opposite faces of the block. One of the pluralities comprises the active themistors and the other the compensating thermistors of a compensated multiple-element bolometer. Each of the thermistors has a pair of signal leads. First and second common conductors are disposed on one side of the block. One of the signal leads of each thermistor of the first plurality is connected to the first common conductor, and one of the signal leads of each thermistor of the other plurality is connected to the second common conductor. First and second junction strips are disposed on another side of the block. Each of the junction strips have printed thereon pluralities of electrical conductors. Each of the other signal leads of first plurality of thermistors is respectively coupled to one of the electrical conductors printed on first junction strip, and each of the other signal leads of the second plurality of thermistors is coupled to one of the electrical conductors printed on the second junction strip.

Figure 3:
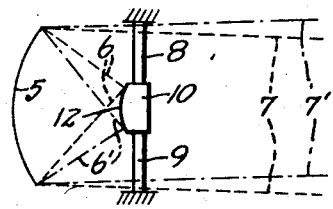
Figs. 3 and 4 are simplified optical diagrams, taken in perpendicular planes which include the optical axis, to show the general cooperation between my multiple-element bolometer construction and a typical collecting optical system.
Figure 4:
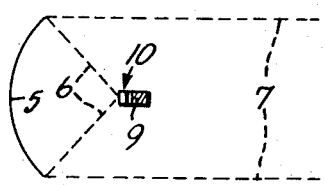

Referring to Figs. 3 and 4, my invention is shown in application to a collecting optical system comprising a collecting mirror 5 receiving distant infrared radiation between ray-bundle limits 7 and converging the same on a focal surface which happens to be arcuate. A multiple-element bolometer assembly 10, supported by radial struts 8—9, has an arcuate sensitive face 12 located in the said focal surface, so that convergent rays between arcuately spaced limits 6—6' serve to image the full effective arcuate extent of the sensitive surface 12 as a line extending across the field of view. Actually, the sensitive surface 12 is composed of a linear array of closely spaced separate bolometer elements, so that a similar plurality of elemental response areas is defined along the line that is imaged across the field. In Fig. 3, the convergent rays 6 are associated with incoming parallel rays 7 serving one arcuate limit of the bolometer array, and the convergent rays 6' are associated with incoming parallel rays 7' serving the opposite arcuate limit of the bolometer array.

Figure 1:
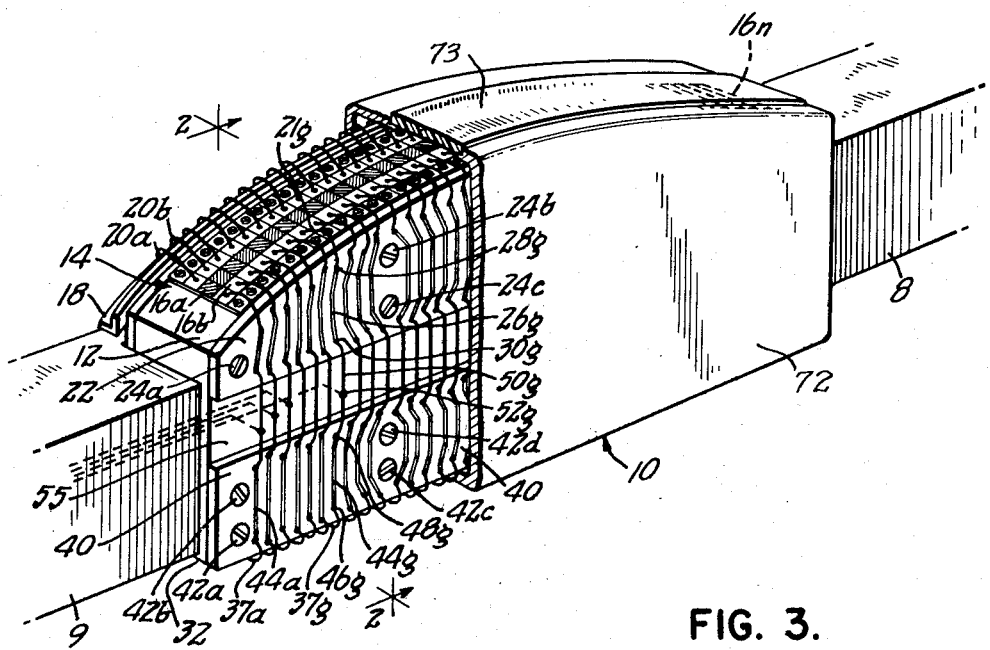
Fig. 1 is a perspective view of a multiple-element bolometer incorporating features of the invention, the housing being partially broken away to reveal internal detail.
Figure 2:
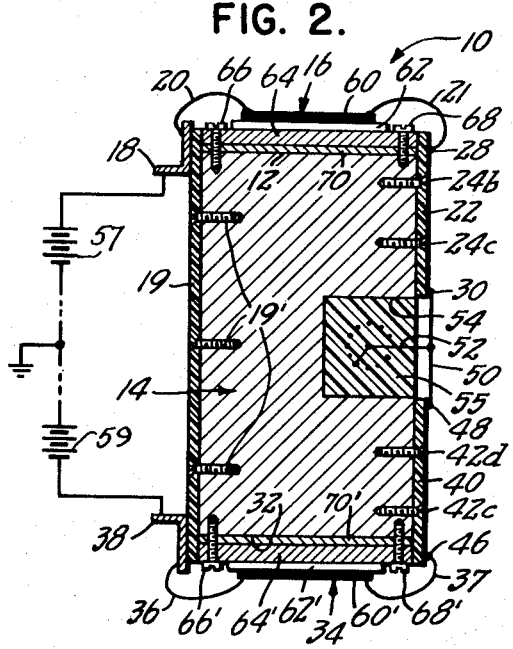
Fig. 2 is a sectional view of the multiple-element bolometer taken along the lines 2—2 of Fig. 1.

More particularly, Fig. 1 shows a compensated multiple-element bolometer 10 for operation with a plurality of balanced bridge circuits, as will more clearly appear. Disposed along the top arcuate face 12 of a block 14, acting as a heat sink, are plural closely spaced active flake thermistor elements 16(a–n); the block 14 is preferably of solid metal construction, as of aluminum, brass or the like, but I hereinafter refer to it as of brass. Each of the thermistor elements 16(a–n) has a pair of signal leads 20(a–n) and 21(a–n). Insulatively mounted along the top of one side of the brass block 14 is a common electrical conductor 18, acting as a bias buss; as shown in Fig. 2, the insulation for buss 18 is a sheet 19 of insulating material, secured by screws 19' to the block 14. One signal lead 20(a–n) of each of the active thermistor elements 16(a–n) is connected to the common conductor 18.

A junction strip 22 of a sheet insulating material is fixed by screws 24(a–n) to the top of the opposite side of the brass block 14. Printed on junction strip 22 are plural electrical conductors 26(a–n). A pair of terminals 28(a–n) and 30(a–n) are connected to opposite ends of the printed electrical conductors 26(a–n). Each of the other signal leads 21(a–n) of the active thermistor elements 16(a–n) is respectively connected to one of the terminals 28(a–n).

Disposed along the bottom face 32 of brass block 14 are a plurality of compensating flake thermistor elements 34(a–n), the section of one of these being shown in Fig. 2. Each of the thermistor elements 34(a–n) has a pair of signal leads 36(a–n) and 37(a–n). Insulatively mounted along the bottom of the one side of the brass block 14 is a common conductor 38 (Fig. 2), acting as a bias buss, the insulation being shown provided by sheet 19 as a common support for both busses 18—38. One signal lead 36(a–n) of each of the compensating thermistor elements 34(a–n) is connected to the common conductor 38.

A junction strip 40 of a sheet of insulating material is fixed by screws 42(a–n) to the bottom of the opposite side of the brass block 14 (see Fig. 1). Printed on conjunction strip 40 are a plurality of electrical conductors 44(a–n). A pair of terminals 46(a–n) and 48(a–n) are connected to opposite ends of the printed electrical conductors 44(a–n). Each of the signal leads 37(a–n) of the compensating thermistor elements 34(a–n) is respectively connected to one of the terminals 46(a–n).

Plural signal jumper leads 50(a–n) respectively couple terminals 30(a–n) on junction strip 22 to corresponding terminals 48(a–n) on junction strip 40. Respectively connected to each of the signal jumper leads 50(a–n) are a plurality of signal take-off leads 52(a–n) for respectively coupling the thermistor elements 16(a–n) and 34(a–n) to associated balanced bridge circuits (not shown); each of the take-off leads 52(a–n) is preferably of individually shielded construction to avoid "cross-talk" between signal channels of the array. An elongated channel 54 is longitudinally cut in the side of the brass block 14 for accommodating the signal take-off leads 52(a–n), and the lead assembly is made secure and permanent by solidly potting all leads 52(a–n) within the groove 54, with a suitable potting compound 55, such as an epoxy resin.

In general, a balanced bridge circuit is defined by each pair of active and compensating thermistor elements, with associated biasing voltages. As shown in Fig. 2, biasing batteries 57—59 apply the same positive and negative bias to all active and compensating elements by way of the busses 18—38, the bias voltages being balanced with respect to ground. Individual bridge outputs are available at signal take-off leads 52(a–n) which, after feeding through one or more suitably potted grooves or channels (not shown) in one or both of the struts 8—9, may be connected directly to individual preamplifiers (not shown) for signal processing and eventual telemetering, recording, or remote display.

Returning to Fig. 2, a typical active thermistor element 16 is shown comprising a flake thermistor 60 having a pair of signal leads 20 and 21 extending from its ends. The flake thermistor 60 is bonded to a sapphire, quartz, glass or other suitable individual heat-sink block 62, which is of course thermally conductive. The heat-sink block 62 is in turn bonded to an individual brass or the like slab 64 acting as a heat conductor to the brass block or master heat sink 14. A pair of screws 66 and 68 passing through holes in the brass slab 64 fix the active thermistor element 16 to the brass block 14. Thus, when a replacement of an active thermistor element is required, it is only necessary to unsolder the signal leads 20—21 from the terminals 18—28, and to remove the screws 66 and 68.

To compensate for any surface irregularities, a very thin shim 70 of lead is interposed between the brass slab 64 and the brass block 14; individual shims 70 may be employed for each individual thermistor slab 64, but I prefer a single shim 70 extending in common for a plurality of thermistor blocks 64. Such a shim is sufficiently malleable to compensate for minute differences in the spacing between the flat brass slab 64 and the arcuate brass block 14, thereby preventing strain development in the individual active thermistor element 16 and further providing good mechanical contact and heat conduction to the entire seat area of the brass block 14.

A typical individual compensating thermistor element 34 is shown fixed to the bottom face 32 of the brass block 14, said element 34 having been selected for matched electrical performance with its active counterpart 16. Since the compensating thermistor element 34 and its manner of mounting are similar to that for the active thermistor element 16, it will not be further described, and primed reference characters are employed for parts corresponding to those already described. The ready replacement feature will also be seen to characterize the individual compensating thermistor assemblies 60'—62'—64', just as described for the individual active thermistor assemblies 60—62—64.

As indicated generally above, the active elements 16(a–n) are all disposed in the focal surface of optics 5 for exposure to collected radiation. To protect all the elements, and at the same time to shield the compensator elements 34(a–n) against exposure, a housing 72 is shown encompassing the entire compensated multiple-element bolometer 10. The housing is of metal, such as brass, sheet steel or the like. The portion of the housing 72 which is opposite the active thermistor elements 16(a–n) is provided with a window 73 of a material transparent to infra-red radiation; a suitable window material is a silver chloride coated with silver sulphide, or arsenic-trisulfide glass may be employed. Thus, the entire compensated multi-element bolometer 10, with the exception of the active thermistor elements 16(a–n) is substantially shielded from infra-red radiation.

There has thus been shown an improved multi-element bolometer with simple and well ordered circuit wiring. Further, while the thermistor elements are highly accessible and easily replaceable, the multi-element bolometer is compact, rugged, and performs with a high degree of reliability. Of particular importance is the fact that my improved construction makes possible the employment of a maximum number of individual bolometer elements with minimum masking effect on the incoming radiation, for any given collecting optical system. The employment of printed-circuit techniques for lead connections not only makes possible an extremely narrow construction, but also means that leads impose no limitation on the number of sensitive elements in a given space, and there is maximum flexibility and accessibility for servicing or replacing individual elements, whether they are part of the active or of the compensating array.

While the invention has been described in detail in connection with the preferred form illustrated, it will be understood that modifications can be made within the scope of the invention as defined in the claims which follow.

What is claimed is:

1. A multiple-element bolometer comprising a metal block, a first plurality of flake thermistors disposed in spaced relation along one face of said block, each of said thermistors having a pair of signal leads, a common electrical conductor disposed along one side of said block, one signal lead of each of said pair being connected to said common electrical conductor, and a junction strip with a plurality of electrical conductors printed thereon, disposed on another side of said block, each of said printed electrical conductors being respectively coupled to the other signal leads of said thermistors.

2. The multiple element bolometer of claim 1, wherein each of said printed electrical conductors has a pair of terminals, each of the signal leads from said thermistors being respectively connected to one of the terminals of said printed electrical conductors, the other terminals of said pairs being provided for coupling to other signal leads.

3. A multi-element bolometer comprising a metallic block, one face of said block being arcuate, a plurality of thermistor elements disposed linearly along said arcuate face, each of said thermistor elements having a pair of signal leads, a common electrical conductor insulatively mounted on one side of said metallic block, one signal lead from each of said thermistor elements being connected to said common electrical conductor, and a junction strip of an electrically insulative material having a plurality of electrical conductors printed thereon, said junction strip being disposed on another side of said metallic block, each of said printed electrical conductors having a pair of terminals, one terminal of each of said pairs being respectively coupled to the other signal lead of each of said thermistor elements.

4. The multi-element bolometer of claim 3, wherein each of said thermistor elements includes a flake thermistor having a pair of signal leads, and an individual mounting block bonded to said flake thermistor, said block being removably secured to said arcuate face.

5. The multi-element bolometer of claim 3, wherein each of said thermistor elements includes a flake thermistor having a pair of signal leads, an individual mounting block bonded to said flake thermistor, a sheet of deformable material interposed between said mounting block and said arcuate face, and means removably securing said block and deformable sheet to said face.

6. The multi-element bolometer of claim 3, wherein each of said thermistor elements includes a slab of brass secured to said face, a sapphire block bonded to the top of said slab of brass, a flake thermistor bonded to the top of said sapphire block, and a pair of signal leads extending from said flake thermistor.

7. A compensated multiple-element bolometer, comprising a metallic block, a plurality of active thermistor elements disposed on the top face of said metallic block, each of said active thermistor elements having a pair of signal leads, a first common electrical conductor insulatively disposed near the top of a first side of said metallic block, one of the signal leads of each of said active thermistor elements being connected to said first common electrical conductor, a first junction strip of insulative material having a plurality of electrical conductors printed thereon, said first junction strip being disposed near the top of a second and opposite side of said metallic block, each of said printed electrical conductors having a pair of terminals, one terminal of each of said pair of terminals being connected respectively to the other signal lead of each of said active thermistor elements, a plurality of compensating thermistor elements disposed on the bottom face of said metallic block, each of said compensating thermistor elements having a pair of signal leads, a second common electrical conductor insulatively disposed near the bottom of said first side of said metallic block, one signal lead of each of said compensating thermistor elements being connected to said second common electrical conductor, and a second junction strip of insulative material having a plurality of electrical conductors printed thereon, said second junction strip being disposed near the bottom of the second and opposite side of said metallic block, each of the printed electrical conductors of said second junction strip having a pair of terminals, one terminal of each of said pairs being respectively coupled to the other signal lead of each of said compensating thermistor elements.

8. The compensated multiple-element bolometer of claim 7, wherein the other terminals of said pairs associated with the printed electrical conductors of said first junction strip are connected respectively to the other terminals of said pairs associated with the printed electrical conductors of said second junction strip.

9. The compensated mulitple-element bolometer of claim 7, including a plurality of signal jumper leads, each of said signal jumper leads connecting one of the other terminals of said pairs associated with the printed electrical conductors of said first junction strip to one of the other terminals of said pairs associated with the printed electrical conductors of said second junction strip, and a plurality of signal take-off leads respectively connected to each of said signal jumper leads.

10. The compensated bolometer of claim 9, wherein a channel in the second side of said metallic block between said first and second junction strips accommodates said signal take-off leads in insulated relation.

11. The compensated bolometer of claim 7, including a housing of opaque material having a window opposite said plurality of active thermistor elements.

12. The compensated bolometer of claim 11, wherein said window is of a material transparent to infrared radiation.

13. The compensated bolometer of claim 11, wherein said window is of silver chloride coated with a film of silver sulphide.

14. The compensated bolometer of claim 11, wherein said window is of arsenic trisulfide.

15. A compensated multiple-element bolometer, comprising a metallic block, having an arcuate top face, a plurality of active thermistor elements transversely disposed on the top face of said metallic block, each of said active thermistor elements having a pair of singal leads, a first common electrical conductor insulatively disposed near the top of a first side of said metallic block, one of the signal leads of each of said active thermistor elements being connected to said first common electrical conductor, a first junction strip of insulative material having a plurality of electrical conductors printed thereon, said first junction strip being disposed near the top of a second and opposite side of said metallic block, each of said printed electrical conductors having a pair of terminals, one terminal of each of said pairs being connected respectively to the other signal lead of each of said active thermistor elements, a plurality of compensating thermistor elements disposed on the bottom face of said metallic block, each of said compensating thermistor elements having a pair of signal leads, a second common electrical conductor insulatively disposed near the bottom of said first side of said metallic block, one signal lead of each of said compensating thermistor elements being connected to said second common electrical conductor, a second junction strip of insulative material having a plurality of electrical conductors printed thereon, said second junction strip being disposed near the bottom of the second and opposite side of said metallic block, each of the printed conductors of said second junction strip having a pair of terminals, one terminal of each of said pairs being respectively coupled to the other signal lead of each of said compensating thermistor elements, a plurality of signal jumper leads, each of said signal jumper leads respectively connecting the other terminal of one of the printed electrical conductors of said first junction strip to the other terminal of one of the printed electrical conductors of said second junction strip, a plurality of signal take-off leads respectively coupled to said signal jumper leads, and a channel cut in the second side of said metallic block between said first and second junction strips for accommodating said signal take-off leads.

16. The compensated multiple-element bolometer of claim 15, wherein each of said thermistor elements includes a flake thermistor having a pair of signal leads; and a block of thermally conductive material bonded to said flake thermistor.

17. The compensated multiple-element bolometer of claim 15, wherein each of said thermistor elements includes a slab of brass, a sapphire block bonded to the top of said slab of brass, a flake thermistor bonded to the top of said sapphire block, and a pair of signal leads extending from said flake thermistor.

18. The compensated multiple-element bolometer of claim 17, wherein sheet lead is interposed between the brass blocks for said thermistor elements and the top face of said metallic block.

19. The compensated multiple-element bolometer of claim 18, including a housing of opaque material with a window opposite said plurality of active thermistor elements, said window being of a material transparent to infrared radiation.

20. A compensated multiple-element bolometer, comprising a metallic block, a plurality of active thermistor elements disposed on the top face of said metallic block, each of said active thermistor elements having a pair of signal leads, a first common electrical conductor insulatively disposed near the top of a first side of said metallic block, one of the signal leads of each of said active thermistor elements being connected to said first common electrical conductor, a plurality of compensating thermistor elements disposed on the bottom face of said metallic block, each of said compensating thermistor elements having a pair of signal leads, a second common electrical conductor insulatively disposed near the bottom of said first side of said metallic block, one signal lead of each of said compensating thermistor elements being connected to said second common electrical conductor, and junction-strip means of insulative material having a plurality of spaced electrical conductor means printed thereon, said junction-strip means being secured to the opposite side of said metallic block with individual printed conductors extending generally in the direction from top to bottom of said metallic block, there being top and bottom terminal ends for each said conductor means, the top terminals for said conductor means being connected to the other signal leads of different of said active thermistor elements, the bottom terminals for each said conductor means being connected to the other signal leads of different compensating thermistor elements.

References Cited in the file of this patent

UNITED STATES PATENTS

| | | |
|---|---|---|
| 1,997,973 | Moore | Apr. 16, 1935 |
| 2,342,245 | Bruce et al. | Feb. 22, 1944 |
| 2,531,624 | Hanscom | Nov. 28, 1950 |